US008681250B2

(12) United States Patent
Culbert et al.

(10) Patent No.: US 8,681,250 B2
(45) Date of Patent: Mar. 25, 2014

(54) ELECTRONIC DEVICE WITH TWO IMAGE SENSORS

(75) Inventors: Michael F. Culbert, Monte Sereno, CA (US); Chris Ligtenberg, San Carlos, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 13/331,543

(22) Filed: Dec. 20, 2011

(65) Prior Publication Data

US 2012/0162465 A1  Jun. 28, 2012

Related U.S. Application Data

(63) Continuation of application No. 12/034,241, filed on Feb. 20, 2008, now Pat. No. 8,115,825.

(51) Int. Cl.
*H04N 5/225* (2006.01)
*H04N 5/235* (2006.01)
*H04N 5/222* (2006.01)

(52) U.S. Cl.
USPC ................... 348/262; 348/223.1; 348/263

(58) Field of Classification Search
USPC ....................... 348/223.1, 262–265
See application file for complete search history.

(56) References Cited

U.S. PATENT DOCUMENTS

| 6,611,289 | B1 | 8/2003 | Yu et al. |
| 6,639,626 | B1 * | 10/2003 | Kubo et al. ............... 348/218.1 |
| 6,762,794 | B1 | 7/2004 | Ogino |
| 7,199,348 | B2 | 4/2007 | Olsen et al. |
| 7,884,309 | B2 | 2/2011 | Olsen et al. |
| 2004/0090550 | A1 | 5/2004 | Park |
| 2005/0099506 | A1 | 5/2005 | Stokes et al. |
| 2005/0128509 | A1 | 6/2005 | Tokkonen et al. |
| 2006/0038901 | A1 | 2/2006 | Tapes |
| 2008/0049100 | A1 | 2/2008 | Lipton et al. |
| 2008/0117316 | A1 | 5/2008 | Orimoto |
| 2008/0117581 | A1 | 5/2008 | Kuo et al. |

OTHER PUBLICATIONS

Tomkins, Michael R., Kodak: New Sensor Tech Promises Improved Sensitivity:, www.imaging-resources.com/news/1181811769.html, Publication Date: Jun. 14, 2007.

* cited by examiner

*Primary Examiner* — Twyler Haskins
*Assistant Examiner* — Dwight C Tejano
(74) *Attorney, Agent, or Firm* — Blakely, Sokoloff, Taylor & Zafman LLP

(57) ABSTRACT

An electronic device for producing an image of an object is disclosed. The electronic device may include a black-and-white camera having a first sensor area configured to receive luma data pertaining to the object. The first sensor area may correspond to a first pixel array, the luma data associated with the first pixel array. The electronic device may also include a color camera having a second sensor area configured to receive chroma data pertaining to the object. The second sensor area may correspond to a second pixel array. The chroma data may be associated with the second pixel array. The electronic device may also include first logic configured to correlate pixels in the first pixel array with locations on the second sensor area.

19 Claims, 4 Drawing Sheets

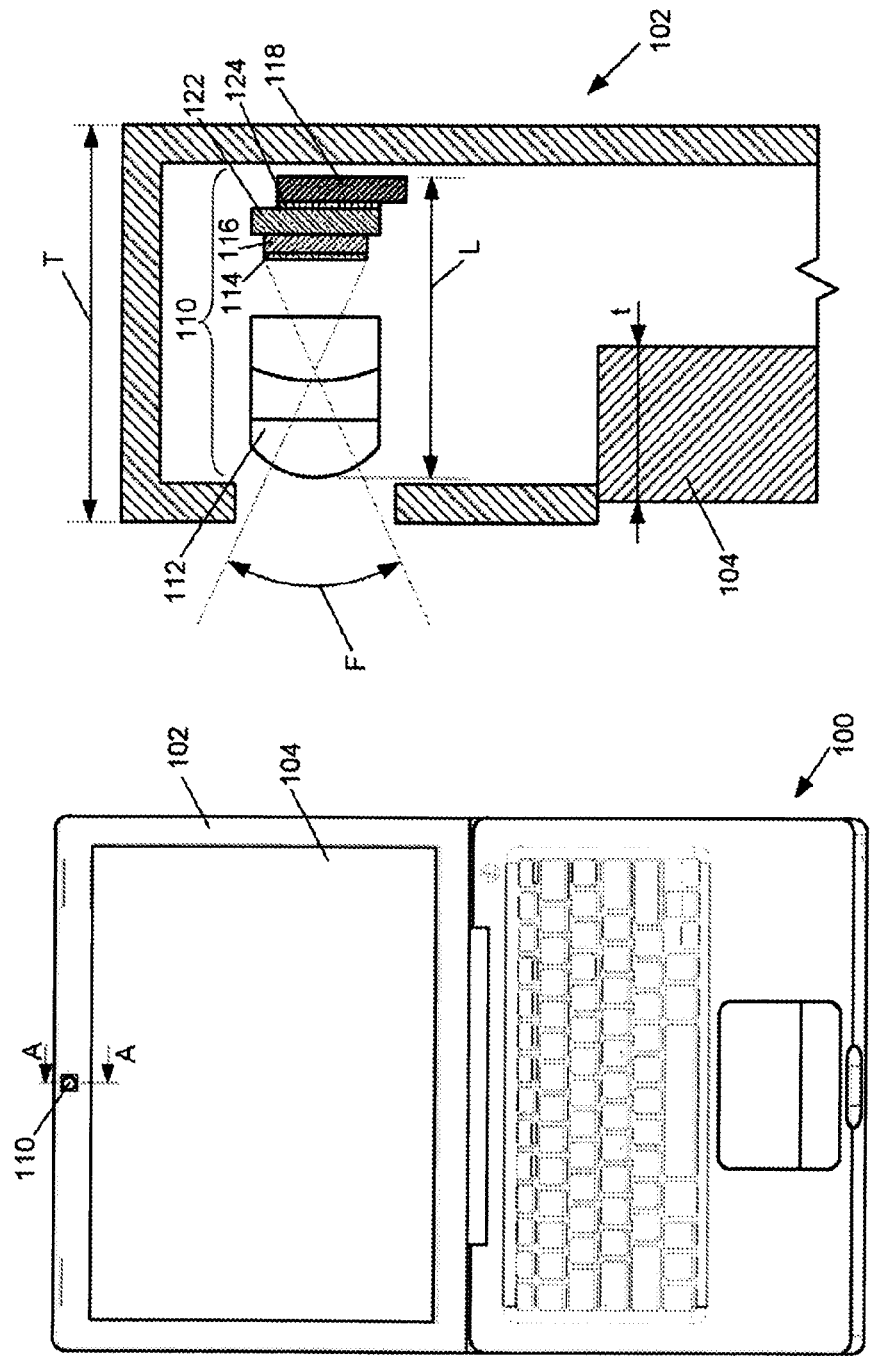

ELECTRONIC DEVICE WITH TWO IMAGE SENSORS

CROSS-REFERENCES TO RELATED APPLICATIONS

This application is a continuation of and claims priority under 35 U.S.C. §120 to U.S. patent application No. 12/034,241, filed Feb. 20, 2008, which is hereby incorporated by reference.

BACKGROUND OF THE INVENTION

Due to industrial design requirements for usability, aesthetics, etc., it is generally desirable to reduce the thickness of an electronic device, for example, a notebook computer or cellular phone. However, for mi electronic device equipped with a camera, given image quality requirements, thickness reduction may be limited by the track length of the camera, as discussed with the reference to the examples of FIGS. 1A-B.

FIG. 1A illustrates a schematic representation of an example prior art electronic device 100 equipped with a color camera 110. Color camera 110 may be installed in a display module 102, which includes a display unit 104.

FIG. 1B illustrates a schematic representation of a partial cross-sectional view through line A-A of electronic device 100 indicated in the example of FIG. 1A. As illustrated in the example of FIG. 1B, color camera 110 may include a lens 112 configured to receive reflected light from an object.

Color camera 110 may also include a sensor area 116. Sensor area 116 may include an array of photo sensors (typically charge coupled device or CCD) configured to collect/receive luma data (i.e., data pertaining to light intensity) and chroma data (i.e., data pertaining to color) from lens 112.

Color camera 110 may also include an optical filter 114 disposed between lens 112 and sensor area 116. Optical filter 114 may be configured to differentiate colors according to wavelengths.

Sensor area 116 may be supported by a substrate 122. Substrate 122 may be electrically coupled with a flex circuit 118 by electrical interconnect 124. Flex circuit 118 may be connected to one or more computing and logic units in electronic device 100.

The total track length L of color camera 110 may represent the distance between the apex of lens 112 and the bottom of flex circuit 118.

For electronic device 100, the thickness t of display unit 104 is less than the total track length L of color camera 110. Accordingly, the thickness T of display module 102 may be primarily determined by the total track length L of color camera 100.

In order to reduce thickness T of display module 102, total track length L of color camera 100 may need to be reduced. Given a specified field of view F, reducing total track length L may require reducing the size of sensor area 116.

The size of sensor area 116 may be reduced by reducing the number of photo sensors in sensor area 116. However, if the number of photo sensors is reduced, the luma data and chroma data received for constructing an image of the object may be insufficient. As a result, the quality of the constructed image may be compromised.

The size of sensor area 116 may also be reduced by reducing the pitch, or the distance between every two adjacent photo sensors. However, if the pitch is reduced, the light received by the photo sensors may be insufficient. Accordingly, the signal-to-noise ratio for the received data may be low. As a result, the image quality may not be acceptable.

Given that optical filter 114 generally may have a low transivity for light, it may be essential to have sufficiently large photo detectors in order to receive a sufficient amount of light. Larger detectors reduce the number of pixels available in a given sensor size.

The size of a color image sensor may be reduced if the number of pixels of the color image sensor is reduced. However, the luma received by the color image sensor may not be sufficient. As a result, the quality of the reconstructed image will be compromised.

As can be appreciated from the foregoing discussion, to provide acceptable image quality, total track length L of color camera 110 may need to be maintained, or even enlarged. Accordingly, thickness T of display module 102 that houses color camera 110 cannot be easily reduced.

SUMMARY OF INVENTION

An embodiment of the present invention relates to an electronic device for producing an image of an object. The electronic device may include a black-and-white camera having a first sensor area configured to receive luma data pertaining to the object. The first sensor area may correspond to a first pixel array, the luma data associated with the first pixel array.

The electronic device may also include a color camera having a second sensor area configured to receive chroma data pertaining to the object. The second sensor area may correspond to a second pixel array. The chroma data may be associated with the second pixel array.

The electronic device may also include first logic configured to correlate pixels in the first pixel array with locations on the second sensor area. The correlation may be performed utilizing at least one of an adjustment formula and one or more geometric relations between the object and at least one of the black-and-white camera and the color camera The electronic device may also include second logic configured to interpolate the chroma data to determine color data associated with the locations on the second sensor area.

The electronic device may also include third logic configured to adjust the color data utilizing the luma data based on the correlation between the locations on the second sensor area and the pixels in the first pixel array to produce image data for the image of the object The above summary relates to only one of the many embodiments of the invention disclosed herein and is not intended to limit the scope of the invention, which is set forth is the claims herein. These and other features of the present invention will be described in more detail below in the detailed description of the invention and in conjunction with the following figures.

BRIEF DESCRIPTION OF THE DRAWINGS

The present invention is illustrated by way of example, and not by way of limitation, in the figures of the accompanying drawings and in which like reference numerals refer to similar elements and in which:

FIG. 1A illustrates a schematic representation of an example prior art electronic device equipped with a color camera.

FIG. 1B illustrates a schematic representation of a partial cross-sectional view of the electronic device illustrated in the example of FIG. 1A.

DETAILED DESCRIPTION OF EMBODIMENTS

Figure 2B:
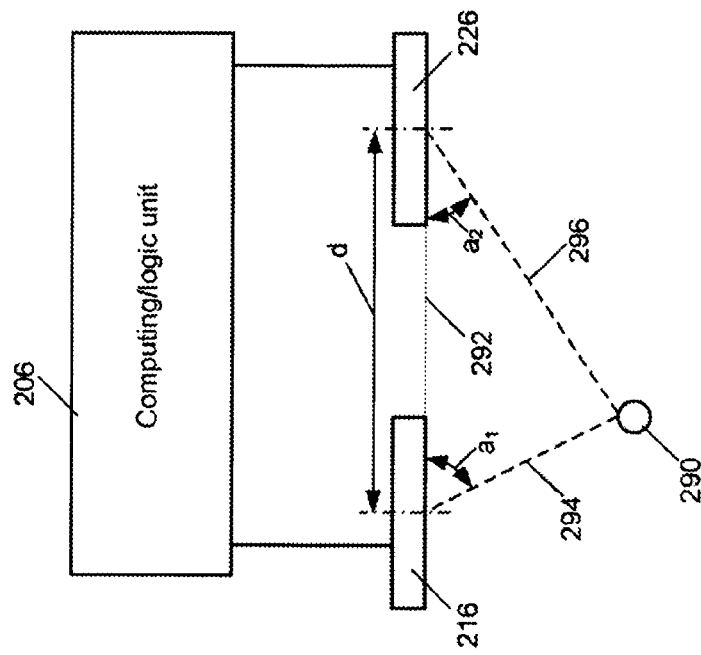
FIG. 2B illustrates a schematic representation of a block diagram of an imaging system of the electronic device illustrated in the example of FIG. 2A, including a first sensor area, a second sensor area, and a computing/logic unit, in accordance with one or more embodiments of the present invention.

The present invention will now be described in detail with reference to a few embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

Various embodiments are described herein below, including methods and techniques. It should be kept in mind that the invention might also cover an article of manufacture that includes a computer readable medium on which computer-readable instructions for carrying out embodiments of the inventive technique are stored. The computer readable medium may include, for example, semiconductor, magnetic, opto-magnetic, optical, or other forms of computer readable medium for storing computer readable code. Further, the invention may also cover apparatuses for practicing embodiments of the invention. Such apparatus may include circuits, dedicated and/or programmable, to carry out operations pertaining to embodiments of the invention. Examples of such apparatus include a general purpose computer and/or a dedicated computing device when appropriately programmed and may include a combination of a computer/computing device and dedicated/programmable circuits adapted for the various operations pertaining to embodiments of the invention.

One or more embodiments of the invention relate to an electronic device for producing an image of an object. For example, the electronic device may represent one or more of a computing device (e.g., a computer), a communication device (e.g., a cellular phone), and an entertainment device (e.g., a media player).

The electronic device may include a black-and-white camera, hereinafter "BW camera". The BW camera may have a first sensor area configured to receive luma data pertaining to the object. The first sensor area may correspond to a first pixel array. The luma data also may be associated with the first pixel array.

The electronic device may include a color camera. The color camera may have a second sensor area configured to receive chroma data pertaining to the object. The second sensor area may correspond to a second pixel array. The chroma data also may be associated with the second pixel array. In one or more embodiments, the color camera does not include a color filler mosaic.

The BW camera aid the color camera may be disposed such that the luma data and the chroma data are received from generally the same perspective, e.g., the same side of the object. For example, the BW camera and the color camera may be disposed without much separation on a display side of a display module of the electronic device to provide this "same perspective" characteristic.

The electronic device may also include correlating logic. The correlating logic may be configured to correlate pixels in the first pixel array with locations on the second sensor area utilizing an adjustment formula. The correlating logic may also be configured to correlate the pixels in the first pixel array with the locations on the second sensor area utilizing one or more geometric relations between the object and at least one of the BW camera and the color camera. The number of the pixels in the first pixel array may be equal to the number of the locations on the second sensor area. The number of the pixels in the first pixel array may be greater than the number of pixels in the second pixel array.

The adjustment formula may pertain to a distance between the BW camera and the color camera. The one or more geometric relations may pertain to at least one of a first angle and a second angle. The first angle may be formed between a first virtual line and a second virtual line. The second angle may be formed between the first virtual line and a third virtual line. The first virtual line may connect a point of the BW camera and a point of the color camera. The second virtual line may connect a point of the object and the point of the BW camera. The third virtual line may connect the point of the object and the point of the color camera. In some embodiments, the one or more geometric relations may pertain to both the first angle and the second angle. The BW camera and the color camera may be aligned horizontally or vertically for simplifying the one or more geometric relations.

The electronic device may also include interpolation logic. The interpolation logic may be configured to interpolate the chroma data to determine color data corresponding to the locations on the second sensor area.

The electronic device may also include adjusting logic. The adjusting logic may be configured to adjust the color data utilizing the luma data based on correlation between the locations on the second sensor area and the pixels in the first pixel array, to produce image data for the image of the object.

The electronic device may also include calibrating logic for converting data, corresponding to each pixel in the first pixel array into a RGB triplet having a red-color value, a green-color value, and a blue-color value. Each of the red-color value, the green-color value, and the blue-color value may be equal to a value of the data. The logic may convert the luma data into RGB triplets and may multiply the color data (resulted from interpolating the chroma data) with the RGB triplets.

The electronic device may also include logic for calibrating the adjustment formula utilizing one or more calibrating objects with brown luma characteristics and chroma characteristics. The one or more calibrating objects may be disposed at various positions relative to at least one of the BW camera and the color camera One or more embodiments of the invention relate a method for producing an image of an object. The method may include receiving luma data pertaining to the object utilizing a first sensor area. The first sensor area may be part of a BW camera. The first sensor area may correspond to a first pixel array. The luma data also may correspond to the first pixel array.

The method may also include receiving chroma data pertaining to the object utilizing a second sensor area. The second sensor area may be part of a color camera. The second sensor area may correspond to a second pixel array. The chroma data also may correspond to the second pixel array.

The method may also include correlating pixels in the first pixel array with locations on the second sensor area utilizing an adjustment formula. Tire correlation may also be performed utilizing one or more geometric relations between the object and at least one of the BW camera and the color camera. The number of the pixels in the first pixel array may be equal to the number of the locations on the second sensor area. The number of the pixels in the first pixel array may be greater than the number of pixels in the second pixel array.

The method may also include calibrating the adjustment formula utilizing one or more calibrating objects with known luma characteristics and chroma characteristics, the one or more calibrating objects disposed at various positions relative to at least one of the BW camera and the color camera.

The method may also include interpolating the chroma data to determine color data corresponding to the locations on the second sensor area. The interpolation may include utilizing data corresponding to pixels in the second pixel array overlapping or being adjacent to each location of the locations on the second sensor area. The interpolation may also include utilizing distances between each location of the locations and the pixels in the second pixel array overlapping or being adjacent to the location.

The method may also include adjusting the color data utilizing the luma data based on correlation between the locations on the second sensor area and the pixels in the first pixel array, to produce image data for the image of the object. The adjustment may include converting the luma data into RGB triplets. The adjustment may also include multiplying the color data with the RGB triplets.

The method may also include converting data corresponding to each pixel in the first pixel array into a RGB triplet having a red-color value, a green-color value, and a blue-color value. Each of the red-color value, the green-color value, and the blue-color value may be equal to a value of the data.

The features and advantages of the present invention may be better understood with reference to the figures and discussions that follow.

Figure 2A:
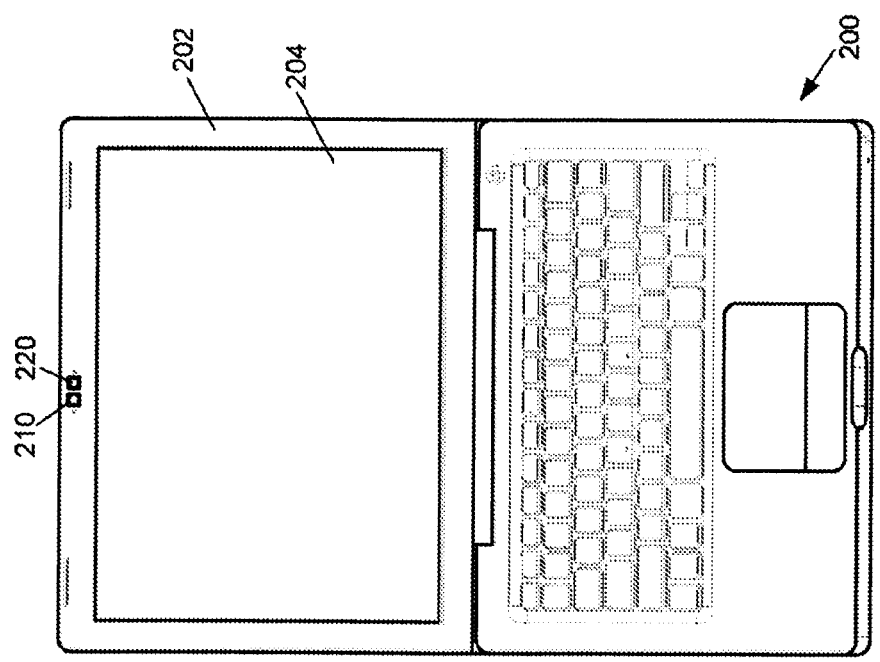
FIG. 2A illustrates a schematic representation of an electronic device, including a black-and-white camera and a color camera, in accordance with one or more embodiments of the present invention.

FIG. 2A illustrates a schematic representation of an electronic device 200, including a black-and-white camera 210 (BW camera 210) and a color camera 220, in accordance with one or more embodiments of the present invention. Electronic device 200 may represent one or more of a computing device (e.g., a notebook computer), a communication device (e.g., a cellular phone), and an entertainment device (e.g., a media player). BW camera 210 and color camera 220 may be installed on a display side of a display module 202, which includes a display unit 204.

Each of BW camera 210 and color camera 220 may (but not required to) have a structure that is substantially similar to the structure of color camera 110 illustrated in the example of FIG. 1B. However, black-and-white camera 210 may not include an optical filter. Accordingly, given the same sensor area, photo sensors in BW camera 210 may receive more light than photo sensors in either of color camera 220 and color camera 110. Further, given the same sensor area, BW camera 210 may provide substantially higher resolution with a larger number of pixels because each pixel in BW camera 210 may require only one monochrome photo sensor. In contrast, each pixel of color camera 110 and color camera 220 may require three photo sensors, i.e., a red-color sensor, a green-color sensor, and a blue-color sensor.

BW camera 210 and color camera 220 may be aligned horizontally with respect to the horizontal edge of display unit 204 (as oriented during use). Alternatively, in one or more embodiments, BW camera 210 and color camera 220 may be aligned vertically. Accordingly, mapping of pixels between the cameras may be simplified, as can be appreciated from subsequent discussions.

FIG. 2B illustrates a schematic representation of a block diagram of an imaging system, including a sensor area 216 of BW camera 210, a sensor area 226 of color camera 220, and a computing/logic unit 206 of electronic device 200, in accordance with one or more embodiments of the present invention. Sensor area 216 may be configured to receive luma data pertaining to an object 290, e.g. pertaining to light reflected and/or emitted by object 290. Sensor area 226 may be configured to receive chroma data pertaining to object 290. Computing/logic unit 206 may be configured to process the luma data and the chroma data.

Computing/logic unit 206 may also be configured to perform correlation (or mapping) of pixels and locations, for producing an image of object 290. The pixels may correspond to sensor areas 216 and/or 226. The locations may be on sensor area 216 and/or 226. The correlation may be performed utilizing one or more geometric parameters pertaining to sensor area 216, sensor area 226, and object 290. For example, the geometric parameters may include distance d between a point of sensor area 216 and a point of sensor area 226. The geometric parameters may also include air angle $a_1$ formed between a virtual line 292 and a virtual line 294. Virtual line 292 may connect sensors 216 and 226. Virtual line 294 may connect sensor area 216 and object 290. The geometric parameters may also include an angle $a_2$ between virtual line 292 and a virtual line 296. Virtual line 296 may connect object 290 and sensor area 226.

The correlation/mapping may also be performed utilizing an adjustment formula. The adjustment formula may be calibrated utilizing one or more objects with known luma and chroma characteristics disposed at various positions relative to sensor areas 216 and/or 226. Accordingly, mapping relations corresponding to various magnitudes of angles $a_1$ and/or $a_2$ may be obtained and incorporated into the adjustment formula.

Figure 2C:
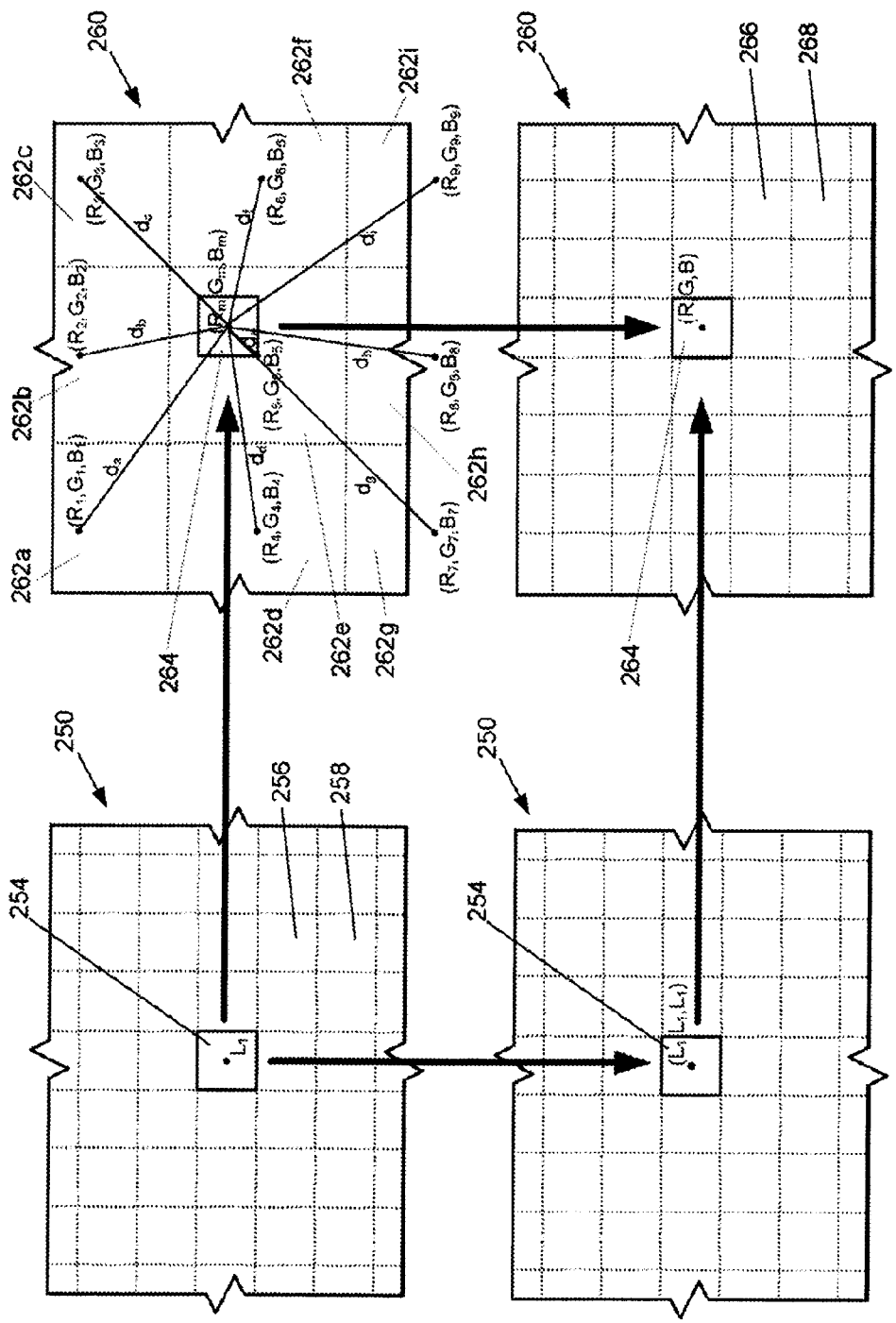
FIG. 2C illustrates a partial schematic representation of a first pixel array corresponding to the first sensor area illustrated in the example of FIG. 2B and a second pixel array corresponding to the second sensor area illustrated in the example of FIG. 2B in accordance with one or more embodiments of the present invention.
Figure 3:
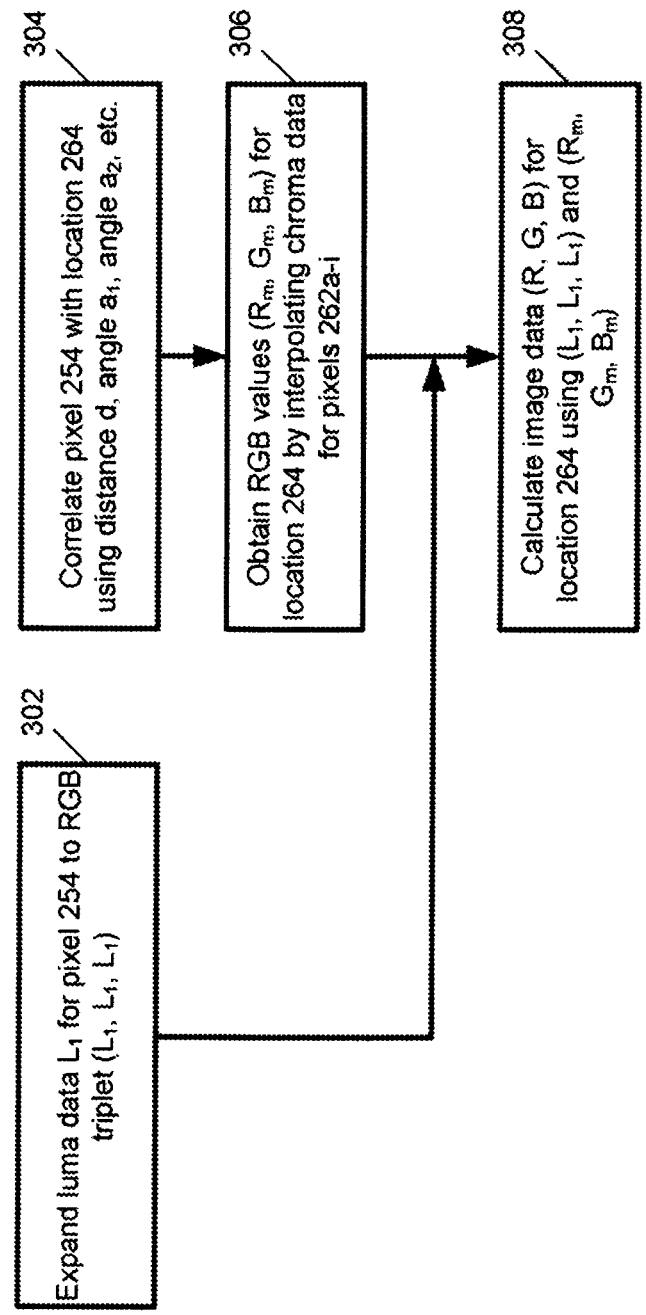
FIG. 3 illustrates a flowchart of a method for producing an image of an object utilizing elements illustrated in the examples of FIGS. 2A-C in accordance with one or more embodiments of the present invention.

FIG. 2C illustrates a partial schematic representation of a pixel array 250 corresponding to sensor area 216 (illustrated in the example of FIG. 2B) and a pixel array 260 corresponding to sensor area 226 (illustrated in the example of FIG. 2B) in accordance with one or more embodiments of the present invention. FIG. 3 illustrates a flowchart of a method for producing an image of an object utilizing elements illustrated in the examples of FIGS. 2A-C in accordance with one or more embodiments of the present invention.

Pixel array 250 may include pixels with luma data received by sensor area 216. The method is illustrated utilizing pixel 254 in pixel area 250 and location 264 on sensor area 226 (corresponding to pixel array 260) as an example. The method illustrated with pixel 254 and location 264 may be simultaneously or sequentially performed for all the pixels in pixel array 250 and for all the corresponding locations on sensor area 226 (corresponding to pixel array 260). The method may also be performed according to various orders of pixel-location pairs.

Turning to FIG. 3, in step 302, logic in computing/logic unit 206 may expand a luma data value pertaining to pixel 254, e.g., $L_1$, to an RGB triplet, e.g., $(L_1, L_1, L_1)$.

In step 304, computing/logic unit 206 may correlate pixel 254 with location 264 on sensor area 226 (corresponding to pixel array 260). The correlation may be performed utilizing one or more of the adjustment formulas, distance d, angle $a_1$, angle $a_2$, etc.

In step 306, computing/logic unit 206 may calculate RGB values ($R_m$, $G_m$, $B_m$) for location 264 by interpolating chroma data pertaining pixels 262a-i, e.g., ($R_1$, $G_1$, $B_1$)-($R_9$, $G_9$, $B_9$), wherein pixel 262e overlaps location 264, and pixels 262a-d and 262f-i are adjacent to location 264. For example, the interpolation may be performed utilizing ($R_1$, $G_1$, $B_1$)-($R_9$, $G_9$, $B_9$) and distances between location 264 and pixels 262a-i, i.e., $d_a$-$d_i$. In one or more embodiments, RGB values ($R_m$, $G_m$, $B_m$) for location 264 may represent a weighted average of chroma data ($R_1$, $G_1$, $B_1$)-($R_9$, $G_9$, $B_9$), weighted according to distances d$a$-d$i$. In one or more embodiments, the RGB values ($R_m$, $G_m$, $B_m$) may be determined using one or more non-linear adjustments.

In step 308, computing/logic unit 206 may calculate image data (R, G, B) for location 264 utilizing the expanded RGB triplet ($L_1$, $L_1$, $L_1$) for luma data and the weighted average RGB values ($R_m$, $G_m$, $B_m$) for color data For example, (R, G, B) may be equal to ($L_1 * R_m$, $L_1 * G_m$, $L_1 * B_m$)

The method, including steps 302-308, may also be performed for all other pixels of pixel array 250, such as pixels 256 and 258, and corresponding locations on sensor area 226 (corresponding to pixel array 260), such as locations 266 and 268. The method may be performed sequentially for all the pixels of pixel array 250. The method may also be performed simultaneously for all the pixels of pixel array 250. The method may also be performed according to various orders of the pixels of pixel array 250

As can be appreciated from the foregoing, embodiments of the invention may collect a large amount of luma data utilizing a BW camera with a relative small number of pixels. Embodiments of the invention may also produce a large amount of color data by interpolating a relatively small amount of chroma data collected by a color camera with a relative small number of pixels. Accordingly, embodiments of the invention may provide high quality of images with a reduced total number of pixels. Advantageously, cost of image sensors of electronic devices may be reduced.

Utilizing a BW camera to collect luma data, embodiments of the invention may mitigate or eliminate the low-transivity problem associated with optical filters. Accordingly, embodiments of the invention may be able to receive more light at each pixel location. As a result, the signal-to-noise ratio may be improved. Advantageously, image quality may be enhanced.

Embodiments of the invention may also eliminate the need for a color filter mosaic. Accordingly, color errors caused by the Nyquist problem may be avoided. Advantageously, color may be correctly presented in images.

While this invention has been described in terms of several embodiments, there are alterations, permutations, and equivalents, which fall within the scope of this invention. It should also be noted that there are many alternative ways of implementing the methods and apparatuses of the present invention. Furthermore, embodiments of the present invention may find utility in other applications. The abstract section is provided herein for convenience and, due to word count limitation, is accordingly written for reading convenience and should not be employed to limit the scope of the claims, ft is therefore intended that the following appended claims be interpreted as including all such alterations, permutations, and equivalents as fall within the true spirit and scope of the present invention.

What is claimed is:

1. An electronic device for producing an image of an object, the electronic device comprising:

a black-and-white camera sensor having a luma pixel array configured to produce luma data pertaining to the object;

a color camera sensor having a chroma pixel array configured to produce chroma data pertaining to the object;

first logic configured to correlate pixels in the luma pixel array with locations on the chroma pixel array using geometric relations between the object and the black-and-white camera sensor and the color camera sensor, wherein the geometric relations pertain to a distance between the black-and-white camera sensor and the color camera sensor;

second logic configured to interpolate the chroma data to determine color data associated with the locations on the chroma pixel array; and third logic configured to adjust the color data using the luma data based on correlation between the locations on the chroma pixel array and the pixels in the luma array to produce image data for the image of the object.

2. The electronic device of claim 1 wherein the number of pixels in the luma pixel array is equal to the number of the locations in the chroma pixel array and is greater than the number of pixels in the chroma pixel array.

3. The electronic device of claim 1 further comprising fourth logic for converting data generated from each pixel in the luma pixel array into a RGB triplet having a red-color value, a green-color value, and a blue-color value, each of the red-color value, the green-color value, and the blue-color value being equal to a value of the data.

4. The electronic device of claim 1 further comprising fourth logic for converting the luma data into RGB triplets and for multiplying the color data with the RGB triplets.

5. The electronic device of claim 1 wherein the geometric relations further pertain to at least one of a first angle and a second angle, the first angle formed between a first virtual line and a second virtual line, the second angle formed between the first virtual line and a third virtual line, the first virtual line connecting a point of the black-and-white camera sensor and a point of the color camera sensor, the second virtual line connecting a point of the object and the point of the black-and-white camera sensor, the third virtual line connecting the point of the object and the point of the color camera sensor.

6. The electronic device of claim 5 wherein the geometric relations pertain to both the first angle and the second angle.

7. The electronic device of claim 1 wherein the first logic is further configured to correlate pixels in the luma pixel array with pixels on the chroma pixel array further using an adjustment formula.

8. The electronic device of claim 7, further comprising fourth logic for calibrating the adjustment formula using one or more calibrating objects with known luma characteristics and chroma characteristics, the one or more calibrating objects disposed at various positions relative to at least one of the black-and-white camera sensor and the color camera sensor.

9. The electronic device of claim 1 wherein the black-and-white camera sensor and the color camera sensor are disposed on a display side of a display module of the electronic device.

10. The electronic device of claim 1 wherein the black-and-white camera sensor and the color camera sensor are disposed such that the luma data and the chroma data are received from a same side of the object.

11. The electronic device of claim 1 wherein the color camera sensor does not include a color filter mosaic.

12. The electronic device of claim 1 wherein the black-and-white camera sensor and the color camera sensor are aligned horizontally for simplifying the geometric relations between the object and the black-and-white camera sensor and the color camera sensor.

13. A method for producing an image of an object, the method comprising:
    receiving luma data pertaining to the object from a luma pixel array of a black-and-white camera sensor;
    receiving chroma data pertaining to the object from a chroma pixel array of a color camera sensor;
    correlating pixels in the luma pixel array with locations on the chroma pixel array using geometric relations between the object and the black-and-white camera sensor and the color camera sensor, wherein the geometric relations pertain to a distance between the black-and-white camera sensor and the color camera sensor;
    interpolating the chroma data to determine color data corresponding to the locations on the chroma pixel array; and
    adjusting the color data using the luma data based on correlation between the locations on the chroma pixel array and the pixels in the luma pixel array to produce image data for the image of the object.

14. The method of claim 13 wherein the number of pixels in the luma pixel array is equal to the number of the locations in the chroma pixel array and is greater than the number of pixels in the chroma pixel array.

15. The method of claim 13 wherein the interpolating includes using data corresponding to pixels in the chroma pixel array overlapping or being adjacent to each location of the locations on the chroma pixel array.

16. The method of claim 13 wherein the interpolating includes using distances between each location of the locations and pixels in the chroma pixel array overlapping or being adjacent to the location of the locations.

17. The method of claim 13 further comprising converting data corresponding to each pixel in the luma pixel array into a RGB triplet having a red-color value, a green-color value, and a blue-color value, each of the red-color value, the green-color value, and the blue-color value being equal to a value of the data.

18. The method of claim 13 wherein the adjusting includes converting the luma data into RGB triplets and multiplying the color data with the RGB triplets.

19. The method of claim 13 wherein the geometric relations further pertain to at least one of a first angle and a second angle, the first angle formed between a first virtual line and a second virtual line, the second angle formed between the first virtual line and a third virtual line, the first virtual line connecting a point of the black-and-white camera sensor and a point of the color camera sensor, the second virtual line connecting a point of the object and the point of the black-and-white camera sensor, the third virtual line connecting the point of the object and the point of the color camera sensor.

* * * * *